United States Patent
Cheng et al.

(10) Patent No.: US 6,934,272 B2
(45) Date of Patent: Aug. 23, 2005

(54) APPARATUS, AND ASSOCIATED METHOD, FOR PERFORMING PACKET ZONE TIMING OPERATIONS AT A MOBILE NODE OPERABLE IN A PACKET RADIO COMMUNICATION SYSTEM

(75) Inventors: Mark W. Cheng, San Diego, CA (US); Liangchi Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/753,961

(22) Filed: Jan. 8, 2004

(65) Prior Publication Data

US 2004/0156348 A1 Aug. 12, 2004

Related U.S. Application Data

(60) Provisional application No. 60/438,726, filed on Jan. 8, 2003.

(51) Int. Cl.$^7$ .................................................. H04Q 7/00
(52) U.S. Cl. ...................... 370/331; 370/332; 370/342; 455/433; 455/434; 455/435; 455/440
(58) Field of Search ................................. 370/331, 342, 370/332; 455/433, 434, 435, 440

(56) References Cited

U.S. PATENT DOCUMENTS

| | | | | |
|---|---|---|---|---|
| 5,673,307 A | * | 9/1997 | Holland et al. ............. | 455/436 |
| 2002/0048266 A1 | * | 4/2002 | Choi et al. .................. | 370/331 |
| 2003/0053431 A1 | * | 3/2003 | Madour ....................... | 370/331 |
| 2003/0119506 A1 | * | 6/2003 | Singhai et al. .............. | 455/435 |
| 2004/0071112 A1 | * | 4/2004 | Hsu et al. .................... | 370/331 |

* cited by examiner

*Primary Examiner*—Steven Nguyen
*Assistant Examiner*—Clemence Han

(57) ABSTRACT

Apparatus, and an associated method, having a packet zone list timer embodied at a mobile node operable in a packet radio communication system. The packet zone list timer provides hysteresis to reduce the possibility of a ping-pong effect when a mobile node is operated at, or crosses, a packet zone boundary. A timer value used by the packet zone timer is selected at the mobile node without the need for network-generated commands to notify the mobile node of the timer value. Comparisons are made at the mobile node, and determinations are made at the mobile node as to whether registration of the mobile node is required.

42 Claims, 2 Drawing Sheets

APPARATUS, AND ASSOCIATED METHOD, FOR PERFORMING PACKET ZONE TIMING OPERATIONS AT A MOBILE NODE OPERABLE IN A PACKET RADIO COMMUNICATION SYSTEM

CROSS-REFERENCE TO RELATED APPLICATIONS

The present application claims the priority of Provisional Patent Application, Application Ser. No. 60/438,726, filed on 8 Jan. 2003, the contents of which are incorporated by reference.

The present invention relates generally to a manner by which to facilitate selection of when to request registration of a mobile node that is movable between different packet zones defined in a packet radio communication system. More particularly, the present invention relates to apparatus, and an associated method, that performs packet zone timing operations at a mobile node. Packet zone timing is performed entirely at the mobile node, free of the need for communication of overhead messaging with a network part of the packet radio communication system.

Use of the packet zone timing provides a selected level of registration hysteresis that reduces the so-called ping-pong effect when the mobile node is operated close to a packet zone boundary. Reduced signaling and corresponding reduced battery power consumption are provided, thereby preserving radio resources and increasing battery longevity.

BACKGROUND OF THE INVENTION

Throughout modern society, the communication of data to effectuate many different types of communication services is pervasive. The ability easily and quickly to access a communication system through which to communicate data pursuant to the effectuation of such services is needed by many. And, as advancements in communication technologies shall likely permit new communication services, the need for such access shall likely increase.

In general, a communication system includes, at a minimum, a set of communication stations that are interconnected by way of a communication channel. At least one of the communication stations of the set forms a sending station, and at least another of the communication stations of the set forms a receiving station. The sending station operates to send data upon a communication channel, and the receiving station operates to detect the data communicated on the communication channel.

A radio communication system is an exemplary type of communication system. In a radio communication system, the communication channel that is used to communicate data between sending and receiving stations is formed on a radio link, a part of the electromagnetic spectrum. The communication channel is referred to as a radio channel. In other communication systems, conductive paths, i.e., wirelines, are generally required to interconnect the communication stations, and the communication channels are defined thereon. Radio channels obviate the need to interconnect the communication stations with the wirelines.

And, because the wirelines are not required to interconnect the communication stations to permit data to be communicated therebetween, radio communication systems permit the effectuation of a communication service even when the communication stations between which data is communicated to effectuate the communication service are positioned at locations between which use of wireline connections would be impractical or unfeasible. That is to say, radio communication systems are able to be used to effectuate communications when the use of corresponding wireline communication systems are not practically possible. Additionally, a radio communication system is amenable for implementation as a mobile communication system in which one or more of the communication stations operable therein is permitted mobility.

A cellular communication system is a type of mobile radio communication system. Cellular communication systems are generally constructed to be operable in conformity with the operating protocols of a standardized operating specification promulgated by a regulatory body. And, the networks of various cellular communication systems, operable pursuant to different operating specifications, have been installed throughout significant portions of the populated areas of the world. Both voice and data communication services are effectuable by way of a cellular communication system.

A user communicates in a cellular communication system through use of a mobile station, referred to herein as a mobile node. A mobile station includes radio transceiver circuitry permitting both the sending and receiving of data with a network part by way of radio channels formed with the network part. Fixed-site transceivers of the network part of the communication system correspondingly operate to transceive data with the mobile node. The fixed-site transceivers are referred to as base transceiver stations, or base stations. Base stations are installed at spaced-apart locations throughout geographical areas that are encompassed by the network parts of the communication systems. A cellular communication system typically includes a large number of base transceiver stations, and each base transceiver station defines a cell that represents a coverage area encompassed by that cell.

When a mobile node is positioned within a cell defined by a particular base station, communications by, and between, the mobile node and the network part of the communication system are generally effectuated with the base station that defines the cell. Due to the inherent mobility of a mobile node, the mobile node might be repositioned, during its operation, or between separate communication sessions, between successive cells defined by successive ones of the base stations.

Several generations of cellular communication systems have been developed and deployed. And, new-generation systems are under development and deployment. While first-generation cellular communication systems utilize analog communication techniques, subsequent generations of the communication systems utilize digital communication technologies. Through the use of digital communication technologies, communications are effectuable through the use of packet-switched communication connections. Analog communication techniques, in contrast, generally require the use of circuit-switched connections. Use of packet-switched connections are generally advantageous as such connections are permitting of more efficient utilization of communication resources allocated to a communication system.

An exemplary, cellular communication system in which packet-switched communication connections are utilized is set forth in the operating protocol of a CDMA2000 operating specification. Packet-based communication services, and the operating protocols for effectuating such services utilizing packet-switched connections are set forth in the operating specification.

Packet zones are defined with respect to packet-based communications. Packet zones are analogous to cells, or groups of cells, defined by network structure to which, and between which, data is communicated with a mobile node pursuant to effectuation of a packet communication service. Packet zone boundaries define the packet zones, and adjacent packet zones are separated by packet zone boundaries.

When a mobile node is operated close to a packet zone boundary, the mobile node might cross the boundary during effectuation of the communication service. When the boundary is crossed, the mobile node must re-register with network structure associated with the packet zone into which the mobile node enters. Or, even absent entry into a new packet zone, the mobile node might be required to, or attempt to, register with the network structure associated with another packet zone.

A so-called ping-pong effect might occur, however, if the mobile node attempts repeatedly to register with alternating network structure associated with the adjacent packet zones. Such repeated attempts causes generation of excessive levels of overhead signaling that is radio-resource consumptive. Additionally, generation of the overhead signaling depletes stored energy of a battery power supply that typically powers a mobile node.

Various proposals have been set forth by which to provide hysteresis to reduce, or to prevent, the occurrence of the ping-pong effect. One proposal, for instance, makes use of a timer that utilizes a network-specified timer value. At least one existing proposal, however, is susceptible to increased levels of communication failure, e.g., call drop or data loss, due to delayed registration of the mobile node at a network entity, i.e., a packet control function/base station, that is associated with a packet zone into which the mobile node enters. To reduce this possibility, the timer value must be set to be of an appropriate value. But, because the timer value is a network-specified value radio resources are required to communicate the network-specified value to the mobile node. Additional problems are also associated with the use of a network-specified value. Prediction of the optimal value is unable deterministically to be set as movement of the mobile node is random, or at least must be presumed to be so.

Accordingly, an improved manner by which to provide hysteresis to reduce the ping-pong effect of operation of a mobile node at a packet zone boundary is therefore required.

It is in light of this background information related to packet radio communication systems that the significant improvements of the present invention have evolved.

SUMMARY OF THE INVENTION

The present invention, accordingly, advantageously provides apparatus, and an associated method, by which to facilitate selection of when to request registration of a mobile node that is movable between different packet zones defined in a packet radio communication system.

Through operation of an embodiment of the present invention, a manner is provided by which to perform packet zone timing operations at a mobile node. Packet zone timing provides hysteresis that reduces the occurrence of the ping-pong effect when a mobile node is operated at a packet zone boundary.

The packet zone timing is performed entirely at the mobile node, thereby to obviate the need to communicate packet zone timing information between a network part of the communication system in which the mobile node is operable and the mobile node. Hysteresis is provided without the need for radio-resource consumptive signaling and concomitant delays otherwise associated with conventional schemes that require interaction with a network part of the communication system.

By providing hysteresis and also obviating the need to utilize radio air resources to perform the packet zone timing operations, reduced signaling and a corresponding reduced battery power consumption are provided through use of an embodiment of the present invention, thereby preserving radio resources and increasing battery longevity.

In one aspect of the present invention, a packet zone timer is implemented at the mobile node. The packet zone timer selectably operates to time for a selected time period that corresponds in length to at least a selected timer value. The packet zone timer starts timing upon the occurrence of a packet zone related event, e.g., crossing by the mobile node of a packet zone boundary. The at least the first selected timer value that defines the selected time period is defined at the mobile node and does not require that the timer value be supplied thereto by the network part of the communication system.

In another aspect of the present invention, when the packet zone list maintenance timer times out, a packet zone indicia is identified. The packet zone indicia that is identified is, e.g., the packet zone in which the mobile node is positioned when the packet zone list maintenance timer times out.

A comparison is performed between the packet zone indicia that is identified when the packet zone list maintenance timer times out and an earlier measured value thereof. If the comparison indicates that the new packet zone indicia differs with the earlier obtained values thereof, a decision is made to request registration of the mobile node with the network. That is to say, a new registration to associate the mobile node with the packet control function/base station, or other network entity, of the packet zone into which the mobile node has entered is made. The use of the timer delays the initiation of the new registration request pending the timing out of the timer. And, the selected timer value that defines the selected time period timed by the timer defines the amount of hysteresis and reduces the occurrence of the ping-pong effect and excessive registration attempts.

In another aspect of the present invention, a selector is further embodied at the mobile node. The selector operates to select the timer value, and corresponding time period, that the packet zone list maintenance timer times. The selector receives selection indicia to permit selection to be made thereat of the selected time period. In one implementation, the selector selects a fixed value, or at least a fixed minimum value, always to be used by the timer as the timer value. In other implementations, the timer value is selected, such as during, or responsive to, a packet data call set up when packet communications by the mobile node are initiated.

The selected timer value is alternately of a static value or a dynamically changeable value. When the timer value is a static value, the same timer value is used for a period, such as the duration of a packet communication session. When a dynamic defined timer value is utilized, the value changes, such as during a single packet communication session.

The selection criteria used by the selector are of any of many selectable variables, measurable or identifiable at the mobile node. For instance, the length of the timer value is selected responsive to the communication delay permitted of the packet communication service to be performed by the mobile node. Or, the selected timer value is related to the permitted data loss rate permitted in the packet communication service. Alternately, or additionally, the selection indicia are related to the amount of stored energy stored at a portable power supply that powers the mobile node.

When the selected timer value is dynamically determined, the value is based, e.g., upon accumulated statistics relating to registration or retransmissions of data at the mobile node. Incremental changes in the timer value as well as exponential, such as pursuant to a back-off scheme, changes are both selectably utilized by the selector.

The hysteresis provided by the user of a packet zone list maintenance timer reduces the occurrence of ping-ponging at the mobile node, reducing the amount of radio resources required of the mobile node during its operation. And, because the timer is embodied at the mobile node and utilizes a timer value selected at the mobile node, free of the need for signaling with the network part of the communication system, radio resource requirements of the mobile node are further reduced.

In these and other aspects, therefore, apparatus, and an associated method, is provided for a packet radio communication system. The packet radio communication system has a mobile node that is selectably for communicating data pursuant to a packet communication service when the mobile node is positioned within a network coverage area of the communication system. The network coverage area is formed of a first packet zone and at least a second packet zone. Initiation of registration of the mobile node at a selected one of the first packet zone and the at least the second packet zone is selectably facilitated. A packet zone list maintenance timer is embodied at the mobile node. The timer exhibits at least a first selected timer value. The timer times a selected time period corresponding to the at least the first selected timer value that commences with the occurrence of a packet zone related event. An identifier is operable at least responsive to timing out of the selected time period by the packet zone list maintenance timer. The identifier identifies packet zone indicia when the packet zone list maintenance timer times out.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
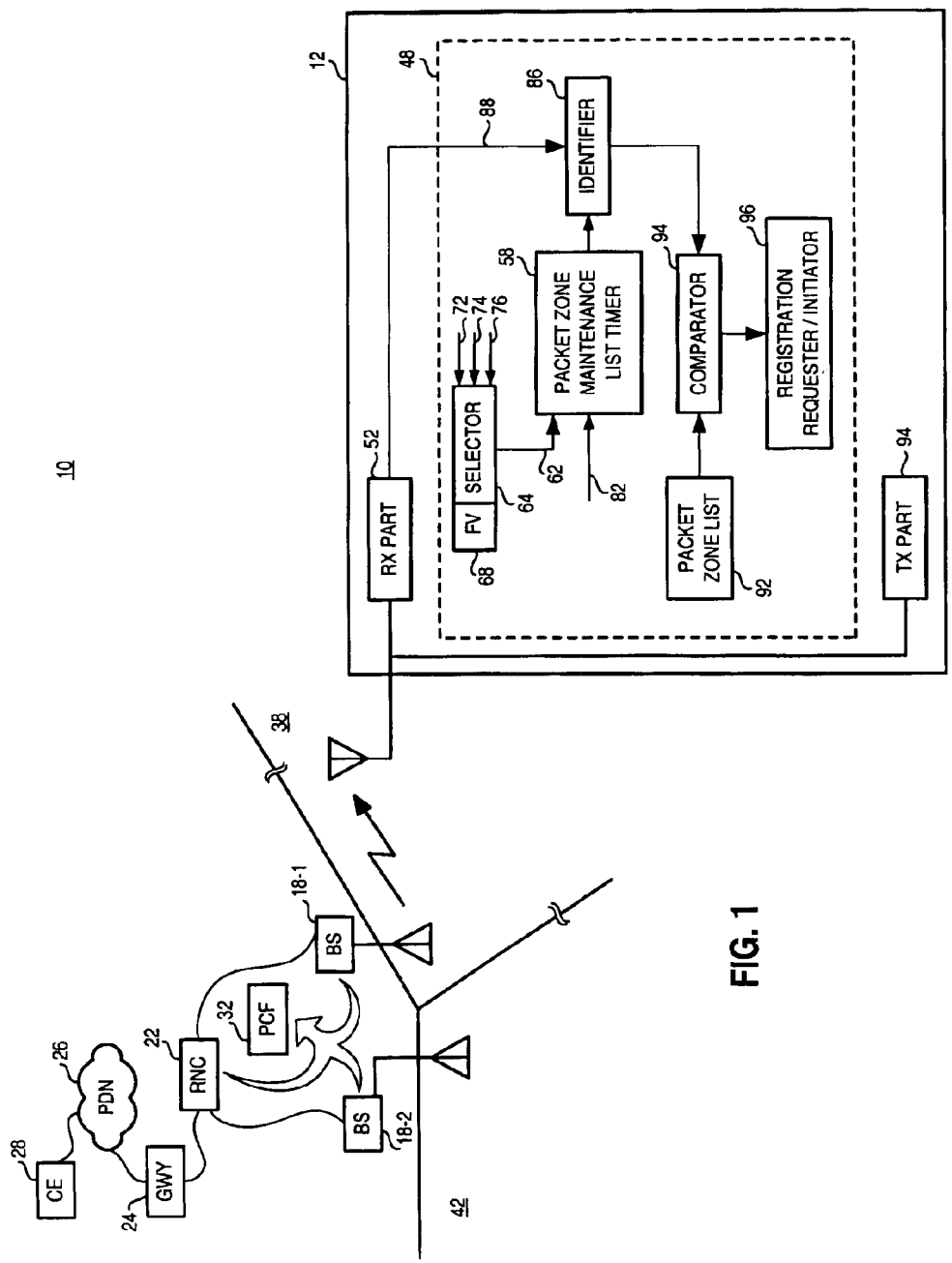
FIG. 1 illustrates a functional block diagram of a radio communication system in which an embodiment of the present invention is operable.

Referring first to FIG. 1, a packet radio communication system, shown generally at 10, that provides for packet radio communications is functionally represented. Packet communication services are effectuable by, and with, mobile nodes, of which the mobile node 12 is representative. In the exemplary implementation, the communication system 10 forms a cellular communication system that is operable generally pursuant to the operating procedures and protocols set forth in a CDMA2000 operating specification, or a variant thereof. While the following description of exemplary operation of an embodiment of the present invention shall be described with respect to its implementation in a cellular communication system operable generally to the CDMA2000 operating specification, in other implementations, an embodiment of the present invention is operable in a cellular radio, or other, communication system operable in other manners, such as pursuant to other operating specifications.

Packet communication services are, for instance, implemented pursuant to packet call procedures, the details of which are set forth in the CDMA2000, or other appropriate, operating specification. The packet communication service is effectuable when the mobile node is stationary or when the mobile node is moving.

Communications by, and with, the mobile node are by way of radio channels defined upon a radio air interface, here indicated by the segment 14. Data communicated by the mobile node is communicated upon reverse link channels defined upon the radio air interface, and data communicated to the mobile node is communicated upon forward link channels defined upon the radio air interface.

The communication system includes a network part here shown to include base stations (BSs) 18. In an actual system, the network part includes, typically, a significant number of base transceiver stations. Here, for purposes of simplicity, two base stations, base stations 18-1 and 18-2, are represented.

The base stations are coupled to a radio network controller (RNC) 22. The radio network controller forms a functional control device that operates, amongst other things, to control operation of the base stations to which the radio network controller is coupled.

The controller 22 is, in turn, coupled to a gateway (GWY) 24 that forms a gateway to a packet data network (PDN) 26. Correspondent entities, such as the correspondent entities (CE) 28 are coupled to the packet data network. A communication path is formable between the mobile node 12 and a correspondent entity, such as the correspondent entity 28, by way of the radio air interface 14 and the network part of the communication system. Packet communications are effectuable by way of packet-switched connections to permit the communication of data pursuant to a packet communication service.

The network part of the communication system also includes a functional entity, a packet control function (PCF) 32. The packet control function is embodied at the base stations 18, the radio network controller 22, or distributed therebetween or elsewhere. The packet control function controls various aspects of packet communications, at least in the radio part of the communication system. Registration of the mobile node, for instance, is controlled, at least in part, by the packet control function.

Packet zones are defined in the packet radio communication system. In the exemplary system shown in FIG. 1, a first packet zone 38 is associated with the base station 18-1 and a second packet zone 42 is associated with the base station 18-2. The association of the packet zones with the base stations 18 is exemplary only. Packet zones are definable in other manners, other than the one-to-one correlation shown in the figure. The packet zones 38 and 42 are separated by a packet zone boundary 44. Generally, the mobile node alerts the network part of the communication system of its location, i.e., in which packet zone that the mobile node is positioned. At the location at which the mobile node is positioned in the figure, the mobile node is registered to be in the first packet zone 38.

Due to the inherent mobility of the mobile node, the mobile node is repositionable, such as during an ongoing packet communication session during which a packet communication service is effectuated, or in which the mobile node is otherwise in an active state, and might travel to, or cross, the packet zone boundary. When the mobile station leaves the packet zone 38 and enters the packet zone 42, new registration of the mobile node, to indicate the positioning of the mobile node in the second packet zone, is generally initiated. As noted previously, if the mobile node passes back and forth across the packet zone boundary or appears to do so, repeated registrations might be initiated by the mobile node to report its location in one or the other of the packet zones. The multiple registration attempts consume radio resources as well as cause depletion of stored energy at a portable battery power supply that powers the mobile node.

Pursuant to an embodiment of the present invention, the mobile node includes apparatus 48 of an embodiment of the present invention. The apparatus selectably operates to provide hysteresis to limit the occurrence of the ping-pong effect. In contrast to conventional devices that provide hysteresis, the apparatus 48 is self-contained, i.e., does not require commands or other instructions to be downloaded by the network by way of the radio air interface for operation. Radio resources are thereby conserved.

The apparatus 48 is coupled to the transceiver circuitry of the mobile node, here formed of a receive part 52 and a transmit part 54.

The entities that form the apparatus 48 are functionally represented and are implementable in any desired manner, such as by algorithms executable by processing circuitry.

The apparatus includes a packet zone maintenance list timer 58. The timer is selectably operable to time for at least first selected time periods. The lengths of the selected time period or periods are provided, here by way of the line 62. And, in the exemplary implementation, the apparatus further includes a selector 64 that selects the lengths of the time periods that the timer times.

The selector selects the lengths of the time periods by any of various selection criteria. The lengths, in one implementation, are statically defined and in another implementation, are dynamically defined. And, in one implementation, the lengths of the time periods are fixed values, identified, e.g., at a memory location (FV) 66. Exemplary selection criteria by which the selector makes selection include a permissible packet service type delay rate, here provided to the selector by way of the line 72, a permissible packet service type data error rate, here applied to the selector by way of the line 74, and the level of the stored energy of a battery power supply, here applied to the selector by way of the line 76. Selection is made based upon any one, or combination, of these as well as other selection criteria. Generally, when increased delay rates are permitted, the timer value selected by the selector is of greater lengths. And, as the permissible data error rate increases, the length selected by the selector correspondingly increase. Additionally, when the stored energy level of the battery power is large, the timer value length is shortened.

Dynamic selection of the selected timer value permits changes in the timer values to be made, such as during effectuation of a packet communication service. The changes in the lengths selected by the selector are incremental, in one implementation. When, for instance, detection is made at the mobile node of a high retransmission rate of the packet data communicated pursuant to the packet communication service, the selector reduces the timer value. Any of various factors cause the packet data retransmissions. If, however, missing data is at a start of a burst without the delivery of insufficient quality frames, there is a possibility that the data has been discarded by the network part of the communication system. A back-off type selection is also selectably made by the selector. When, for instance, too many unneeded originations are made by the mobile node, a back-off mechanism is used, in one implementation, to increase the delay between the origination attempts. Origination is considered to be unneeded when no data transfer occurs between adjacent originations.

The packet zone maintenance list timer commences timing, e.g., upon packet call set-up at the mobile node, indications of which are provided to the timer on the line 82. The timer times for a time period corresponding to the selected timer length provided on the line 62. When the timer times out, an indication of the timing out of the timer is provided to an identifier 86. At the time at which the identifier is notified of the timing out of the timer, a packet zone indicia is identified by the identifier. In the exemplary implementation, the packet zone in which the mobile node is positioned forms the packet zone identifier identified by the identifier. Here, the packet zone in which the mobile node is positioned is provided to the identifier on the line 88, here provided by the receive part 52.

A packet zone list 92 is also maintained by the mobile node. Entries contained on the list identify the packet zone in which the mobile node was earlier indicated to be positioned.

The apparatus also includes a comparator 94. The comparator is coupled to receive values identified by the identifier and values of an entry contained at the packet zone list. The comparator compares the values and determines whether the values are similar. If the values correspond, the packet zone in which the mobile node is positioned when the packet zone maintenance list timer times out corresponds to the earlier identified packet zone. If the values are dissimilar, the mobile node is determined to be in a new packet zone, relative to the earlier indicated packet zone.

The apparatus further includes a registration requester/initiator 96. When the comparator determines that the mobile node is positioned in a new packet zone, an indication of the determination is provided to the requester/initiator, and the requester/initiator initiates a registration request that is provided to the transmit part 54 of the mobile node.

Through the use of the packet zone maintenance list timer, new registration requests are delayed at least until the timer times out the selected time period. And, because the timer value is selected at the mobile node, the apparatus is self-contained, that is, downloading of commands including the selection of the timer value to be used at the timer are obviated.

Figure 2:
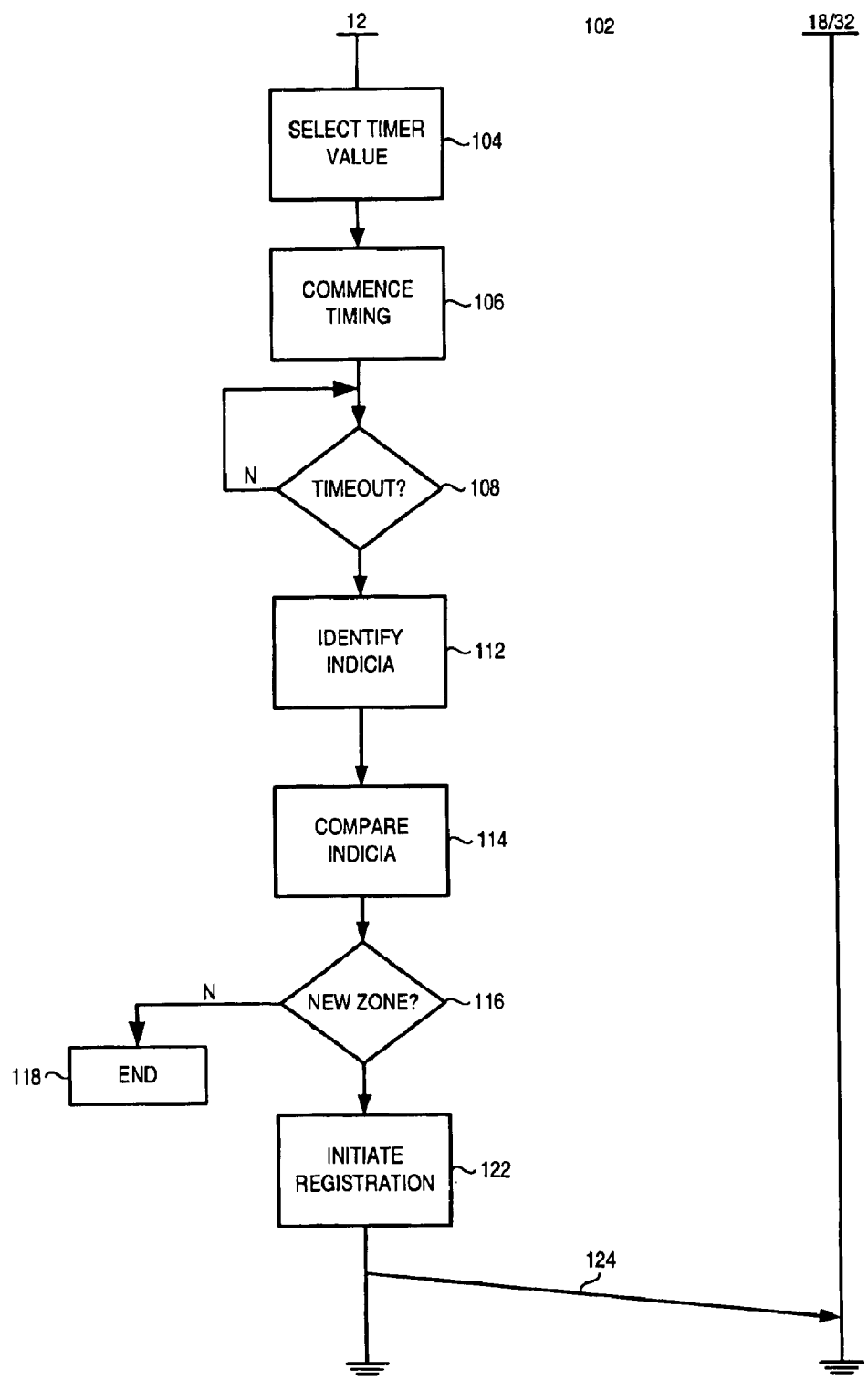
FIG. 2 illustrates a partial process diagram, partial message sequence diagram, representative of operation of the radio communication system shown in FIG. 1 pursuant to operation of an embodiment of the present invention.

FIG. 2 illustrates a representation, shown generally at 102, of operation of an embodiment of the present invention, such as at the apparatus 48 shown in FIG. 1. A general overview of the representation indicates that the operations are performed at the mobile node, free of the need of control by a network entity, such as the PCF/BS (Point Control Function/Base Station).

First, and as indicated by the block 104, selection is made of at least a first selected timer value. The timer value is used by a packet zone maintenance list timer to define the time period during which the timer times. Responsive to the occurrence of an event, timing commences, indicated by the block 106. Timing continues until the selected time period times out. Determination is made, indicated by the decision block 108, as to whether the time period has timed out. If not, the no branch is taken and determination is again made.

If, conversely, the time period has timed out, the yes branch is taken to the block 112, and a packet zone indicia is identified. The packet zone indicia forms, for instance, an identification of the packet zone in which the mobile node is positioned when the timer times out.

Comparisons are made, here indicated at the block 114, of the values of the packet zone indicia just-identified together with values previously obtained.

A determination is made at the decision block 116 as to whether the comparison indicates values to be dissimilar. If not, the mobile node is determined to be in the same packet zone as previously positioned, and a branch is taken to the end block 118. If, conversely, the mobile node is determined to be positioned in a new packet zone, a new registration is initiated, indicated by the block 122. And, as indicated by the segment 124, registration is initiated.

All operations are pursuant to packet zone timing are performed at the mobile node, thereby minimizing the radio resources required to provide hysteresis are minimal.

The previous descriptions are of preferred examples for implementing the invention, and the scope of the invention should not necessarily be limited by this description. The scope of the present invention is defined by the following claims.

What is claimed is:

1. A packet radio communication system having a mobile node selectably for communicating data pursuant to a packet communication service when positioned within a network coverage area of the communication system, the network coverage area formed of a first packet zone and at least a second packet zone, an improvement of apparatus for selectably facilitating initiation of registration of the mobile node at a selected one of the first packet zone and the at least the second packet zone, said apparatus comprising:

a packet zone list maintenance timer embodied at the mobile node and exhibiting at least a first selected timer value, the first selected timer value comprising a fixed value, said packet zone list maintenance timer for timing a selected time period corresponding to the at least the first selected timer value commencing with occurrence of a packet-zone related event; and an identifier operable at least responsive to timing-out of the selected time period by said packet zone list maintenance timer, said identifier for identifying a packet-zone indicia when said packet zone list maintenance timer times out.

2. The apparatus of claim 1 further comprising a registration initiator adapted to receive indications of the packet-zone indicia identified by said identifier, said registration initiator for initiating registration of the mobile node when the packet-zone indicia identified by said identifier differ with earlier-obtained values thereof.

3. The apparatus of claim 1 wherein the selected time period comprises a selected static time period corresponding to a first selected statically defined timer value, the first selected statically defined timer value selected responsive to at least a first communication factor.

4. The apparatus of claim 2 wherein the packet communication service is of a selected service type and wherein the first communication factor responsive to which the first selected statically defined timer value is selected is related to the selected service type of the packet communication service.

5. The apparatus of claim 4 wherein the selected service type of the packet communication service is permitting of a selected communication delay and wherein the first selected statically defined timer value is directly related to the selected communication delay permitted of the packet communication service.

6. The apparatus of claim 4 wherein the selected service type of the packet communication service is permitting of a selected data loss rate and wherein the fist selected statically defined timer value is inversely related to the selected data loss rate permitted of the packet communication service.

7. The apparatus of claim 1 wherein the mobile node is powered by a portable power supply that exhibits a stored energy level and wherein a first selected statically defined timer value is inversely related to the stored energy level of the portable power supply.

8. The apparatus of claim 1 further comprising a selector embodied at the mobile node, said selector for selecting the at least the first selected timer value that corresponds to selected time period timed by said packet zone list maintenance timer and wherein said packet zone list maintenance timer is adapted to receive indications of selections made by said selector.

9. The apparatus of claim 8 wherein the packet communication service commences with a packet data call set-up and wherein the at least the first timer value selected by said selector is selected responsive to the packet data call set-up.

10. The apparatus of claim 1 wherein the packet-zone related event, responsive to the occurrence of which said packet zone list maintenance timer times for the selected time period comprises detection of passage of the mobile node between the first packet zone and the second packet zone.

11. The apparatus of claim 1 wherein the packet-zone indicia identified by said identifier comprises an indication of in which of the first and at least second packet zones, respectively, that the mobile node is positioned.

12. The apparatus of claim 11 further comprising a comparator adapted to receive values representative of the packet-zone indicia identified by said identifier and earlier-obtained values thereof, said comparator for comparing the values provided thereto.

13. The apparatus of claim 12 wherein said comparator further generates a registration request signal of a value requesting initiation of a mobile-node registration when comparison performed by said comparator indicates dissimilarities between the values representative of the packet-zone indicia and the earlier-obtained values thereof.

14. A method of communicating in a packet radio communication system having a mobile node selectably for communicating data pursuant to a packet communication service when positioned within a network coverage area of the communication system, the network coverage area formed of a first packet zone and at least a second packet zone, said method for selectably facilitating initiation of registration of the mobile node at a selected one of the first packet zone and the at least the second packet zone, said method comprising the operations of:

timing, at the mobile node, a selected time period, the selected time period corresponding to at least a first selected timer value, the first selected timer value comprising a fixed value said timing commencing with occurrence of a packet-zone related event; and identifying, at the mobile node, responsive to timing out of the selected time period during said timing the selected time period, a packet-zone indicia.

15. The method of claim 14 further comprising an operation, prior to said operation of timing of:

selecting, at the mobile node, the at least the first selected timer value.

16. The method of claim 15 wherein the packet communication services commences, at the mobile node, with a packet data call set-up and wherein said operation of selecting is performed responsive to the packet data call set-up.

17. The method of claim 14 further comprising an operation of comparing a value of the packet-zone indicia with an earlier-obtained value thereof.

18. The method of claim 17 further comprising the operation at the mobile node of requesting registration of the mobile node when said operation of comparing indicates dissimilarities between the values representative of the packet-zone indicia and the earlier-obtained values thereof.

19. Apparatus for a packet radio communication system having a mobile node selectably for communicating data pursuant to a packet communication service when positioned within a network coverage area of the communication system, the network coverage area formed of a first packet zone and at least a second packet zone, said apparatus for selectably facilitating initiation of registration of the mobile node at a selected one of the first packet zone and the at least the second packet zone, said apparatus comprising:
 a packet zone list maintenance timer embodied at the mobile node and exhibiting at least a first selected timer value, said packet zone list maintenance timer for timing a first selected time period corresponding to a first selected statically defined timer value commencing with occurrence of a packet-zone related event and selected responsive to at least a first communication factor; and
 an identifier operable at least responsive to timing-out of the selected static time period by said packet zone list maintenance timer, said identifier for identifying a packet-zone indicia when said packet zone list maintenance timer times out.

20. Apparatus for a packet radio communication system having a mobile node selectably for communicating data pursuant to a packet communication service when positioned within a network coverage area of the communication system, the network coverage area formed of a first packet zone and at least a second packet zone, and the mobile node powered by a portable power supply that exhibits a stored energy level, said apparatus for selectably facilitating initiation of registration of the mobile node at a selected one of the first packet zone and the at least the second packet zone, said apparatus comprising:
 a packet zone list maintenance timer embodied at the mobile node and exhibiting at least a first selected statically-defined timer value, said packet zone list maintenance timer for timing a selected time period corresponding to the at least the first selected timer value commencing with occurrence of a packet-zone related event and inversely related to the stored energy level of the portable power supply; and
 an identifier operable at least responsive to timing-out of the selected time period by said packet zone list maintenance timer, said identifier for identifying a packet-zone indicia when said packet zone list maintenance timer times out.

21. Apparatus for a packet radio communication system having a mobile node selectably for communicating data pursuant to a packet communication service when positioned within a network coverage area of the communication system, the network coverage area formed of a first packet zone and at least a second packet zone, said apparatus for selectably facilitating initiation of registration of the mobile node at a selected one of the first packet zone and the at least the second packet zone, said apparatus comprising:
 a packet zone list maintenance timer embodied at the mobile node and exhibiting at least a first selected timer value, said packet zone list maintenance timer for timing a selected time period corresponding to the at least the first selected timer value commencing with occurrence of a packet-zone related event, the packet-zone related event comprising detection of passage of the mobile node between the first packet zone and the second packet zone; and
 an identifier operable at least responsive to timing-out of the selected time period by said packet zone list maintenance timer, said identifier for identifying a packet-zone indicia when said packet zone list maintenance timer times out.

22. A packet radio communication system having a mobile node selectably for communicating data pursuant to a packet communication service when positioned within a network coverage area of the communication system, the network coverage area formed of a first packet zone and at least a second packet zone, said apparatus for selectably facilitating initiation of registration of the mobile node at a selected one of the first packet zone and the at least the second packet zone, said apparatus comprising:
 a packet zone list maintenance timer embodied at the mobile node and exhibiting at least a first selected timer value, said packet zone list maintenance timer for timing a selected time period of a dynamically alterable length and corresponding to the at least the first selected timer value commencing with occurrence of a packet-zone related event; and
 an identifier operable at least responsive to timing-out of the selected time period by said packet zone list maintenance timer, said identifier for identifying a packet-zone indicia when said packet zone list maintenance timer times out.

23. Apparatus for a mobile station operable to receive packet data in a packet radio communication system, said packet radio communication system having at least two packet zones, said apparatus comprising:
 a packet zone timer associated with a packet zone indicia, said packet zone timer embodied at the mobile station and exhibiting a selected timer value, the selected timer value selected at the mobile node, said packet zone timer for timing for a period corresponding to the selected timer value, timing of the period commencing with occurrence of a packet-zone related event.

24. The apparatus of claim 23 whereas the selected timer value is set by the mobile station.

25. The apparatus of claim 23 wherein the selected timer value exhibited by said packet zone timer is stored at the mobile station.

26. The apparatus of claim 23 further comprising a memory location for storing the selected timer value thereat.

27. The apparatus of claim 26 wherein the selected timer value stored at said memory location comprises a fixed value.

28. The apparatus 27 wherein the selected timer comprises a first selected timer value and a second selected timer value, the first timer value and the second timer value stored at said memory location.

29. The apparatus of claim 23 further comprising a packet zone list, said packet zone list for storing an identifier that identifies a selected one of a first packet zone and at least a second packet zone of the at least two packet zones.

30. The apparatus of claim 29 further comprises a comparator for comparing the identifier stored at said packet zone list with location of mobile node when timing-out of said packet zone timer.

31. The apparatus of claim 23 wherein the packet-zone related event, occurrence of which causes commencement of timing of said packet zone timer, comprises detection of passage of the mobile station between the packet zones.

32. The apparatus of claim 23 wherein the mobile node forms a part of a radio communication system having a network part that sends control commands to the mobile node and wherein selection of the selected timer value exhibited by said packet zone timer is made free of control commands sent by the network part.

33. A method for facilitating control of registration of a mobile node operable in a packet radio communication system, said method comprising the operations of:

timing for a time period corresponding to a selected timer value commencing with occurrence of a packet-zone related event, the selected timer value selected at the mobile node; and selecting whether to register the mobile node subsequent to expiration of the time period timed during said operation of timing.

34. The method of claim 33 further comprising the operation of preventing registration of the mobile node prior to expiration of the time period timed during said operation of timing.

35. The method of claim 34 wherein the selected timer value corresponding to the time period during said operation of timing comprises a statically defined value formed at the mobile node.

36. The method of claim 34 wherein the selected timer value corresponding to the time period timed during said operation of timing comprises a stored value, stored at the mobile station.

37. The method of claim 34 further comprising the operation, prior to said operation of timing, of storing the selected timer value at the mobile node.

38. The method of claim 37 wherein the selected timer value stored during said operation of storing comprises a fixed value.

39. The method of claim 37 wherein the selected timer value comprises a first selected timer value comprising a first selected timer value and a second selected timer value, and wherein said operation of storing comprises storing the first selected timer value and the second selected timer value at the mobile node.

40. The method of claim 34 further comprising the operation of storing an identifier that identifies at least a selected one of the first packet zone and the least the second packet zone.

41. The method of claim 40 further comprising the operation of comparing the identifier stored during said operation of storing the identifier with a location of the mobile node when upon expiration of the time period timed during said operation of timing.

42. The method of claim 34 wherein the radio communication system comprises a network part that sends control commands to the mobile node and wherein the selected timer value selected at the mobile node is selected at the mobile node and is selected free of the control commands sent to the mobile node.

\* \* \* \* \*